United States Patent [19]

Fries, Jr.

[11] Patent Number: 4,540,391
[45] Date of Patent: Sep. 10, 1985

[54] METHOD AND APPARATUS FOR SKIVING AND HEMMING

[75] Inventor: Carl J. Fries, Jr., Holland, Pa.

[73] Assignee: International Paper Company, New York, N.Y.

[21] Appl. No.: 447,104

[22] Filed: Dec. 6, 1982

[51] Int. Cl.³ .............................................. B31C 11/02
[52] U.S. Cl. .................................. 493/287; 493/356; 493/291; 493/370; 409/138
[58] Field of Search .............. 493/356, 327, 326, 295, 493/299, 287, 291, 352, 370, 341, 357, 358, 360, 361; 156/157, 229; 409/138

[56] References Cited

U.S. PATENT DOCUMENTS

| | | |
|---|---|---|
| 496,131 | 4/1893 | Peirce . |
| 527,963 | 10/1894 | Gay .................................. 83/875 |
| 1,602,597 | 10/1926 | Staude .............................. 493/327 |
| 1,756,157 | 4/1930 | Jouret ................................ 493/60 |
| 1,775,753 | 9/1930 | Evans et al. ...................... 493/309 |
| 1,854,481 | 4/1932 | Mudd ................................ 83/875 |
| 1,921,269 | 8/1933 | Staude ................................ 93/52 |
| 1,968,982 | 1/1934 | Cousino ............................... 3/100 |
| 2,096,044 | 10/1937 | Johns .................................. 154/2 |
| 2,117,460 | 5/1938 | Staude ................................ 93/52 |
| 2,255,472 | 8/1941 | Quarnstrom ...................... 138/156 |
| 2,440,120 | 4/1948 | Ringler .............................. 93/53 |
| 2,549,254 | 4/1951 | Smyth .............................. 144/278 |
| 2,595,483 | 5/1952 | Petter .............................. 144/117 |
| 2,873,565 | 2/1959 | Arneson ............................. 53/29 |
| 2,929,437 | 3/1960 | Stevens ............................ 493/326 |
| 3,018,212 | 1/1962 | Chinn ............................... 156/195 |
| 3,028,743 | 4/1962 | Braun ................................. 3/100 |
| 3,057,267 | 10/1962 | Johnson, Jr. ......................... 93/53 |
| 3,058,868 | 10/1962 | Schroeder ......................... 493/360 |
| 3,074,327 | 1/1963 | Grahn ................................ 93/58 |
| 3,099,378 | 1/1963 | Schroeder .......................... 229/5.5 |
| 3,182,882 | 5/1965 | Aellen, Jr. et al. ................. 229/4.5 |
| 3,362,294 | 1/1968 | Oxel ................................. 409/138 |
| 3,365,111 | 1/1968 | Nair, Jr. et al. .................... 229/17 |
| 3,465,625 | 8/1969 | Daly ................................. 83/100 |
| 3,495,507 | 2/1970 | Haas et al. ....................... 493/352 |
| 3,604,317 | 9/1971 | Baun ................................ 493/287 |
| 3,654,842 | 4/1972 | Schwenk .......................... 493/321 |
| 3,687,351 | 8/1972 | Kaercher et al. ................... 229/3.1 |
| 3,795,164 | 3/1974 | Schneider ........................... 83/349 |
| 3,816,206 | 6/1974 | Coster ............................. 156/218 |
| 4,003,276 | 1/1977 | Schmitt ............................. 83/100 |
| 4,033,474 | 7/1977 | Rentmeester ....................... 220/75 |
| 4,254,693 | 3/1981 | Schadonski et al. ............... 493/228 |
| 4,401,004 | 8/1983 | Glans et al. ........................ 83/875 |

FOREIGN PATENT DOCUMENTS 1122346 8/1968 United Kingdom .

OTHER PUBLICATIONS

"Milling Handbook of High-Efficiency Metal Cutting", General Electric, 1980, pp. 58, 59.

Primary Examiner—Daniel C. Crane
Assistant Examiner—David B. Jones
Attorney, Agent, or Firm—Richard J. Ancel

[57] ABSTRACT

A method and apparatus are disclosed for skiving and hemming one or more edges of a paperboard web or blank to improve the sealing qualities of a container made from the paperboard. The paperboard is skived twice generally parallel to its edge, once to define an oblique surface and once to make a flat skived surface. The latter is folded over the former and heat-sealed to a heat sealable material adjacent the skived region, defining a wedge-shaped edge portion. The folded over part is preferably ironed to produce a substantially flat sheet, and the wedge-shaped edge is preferably reshaped at some point in the process to make the entire folded over surface substantially flush with the unskived surface to which it is sealed. The flat skived surface is preferably made by a milling procedure in which the milling teeth strike the material while moving in a direction opposite to that of the motion of the material.

24 Claims, 26 Drawing Figures

METHOD AND APPARATUS FOR SKIVING AND HEMMING

BACKGROUND OF THE INVENTION

This invention relates to a skived and hemmed blank construction, and to a method and an apparatus exhibiting particular utility in the treatment of paperboard blanks and webs to render them more useful for packaging.

Paperboard containers are widely used for the packaging of foodstuffs such as powdered mixes, cereals, corn chips and the like and are suitable for packaging liquids in general and many non-food substances, particularly those which are moisture-sensitive. Such containers are often formed from precut blanks comprising paperboard covered on both surfaces with a thermoplastic material such as polyethylene. The polyethylene inhibits passage through the paperboard of bacteria and other microorganisms, moisture, and the contents of the container. Additionally, the thermoplastic coating serves as an adhesive when subjected to heat and pressure. Thus, seams or joints between overlapped edges of the blank may be made by applying heat and pressure to the overlapped edges. The laminate also frequently includes a layer of metal foil (e.g., aluminum) to make the material relatively impervious to oxygen.

The sequence of operations for producing a paperboard container of this kind is as follows. A laminate comprising paperboard covered on both surfaces with a thermoplastic material, such as polyethylene, is formed in webs of indefinite lengths. Blanks of a desired size and shape are then cut out from the webs. The blanks are shipped to a packaging plant, where they are folded or wrapped by automatic machinery to form a tube which typically is provided with an end closure. The containers thus formed are then filled with a product by means of automatic filling apparatus after which a closure is affixed to the open end of each container.

After the blank has been formed and seamed into a tube, one edge of the blank, at the tube seam, is located inside the container (hereinafter "the inside edge"). If the inside edge is raw or exposed, the paperboard layer will come into contact with the contents of the container. Such contact is undesirable because any liquid in the container will wick into the cut or raw edge of the blank, and enter the paperboard component of the laminate. In addition, if a raw, cut edge of the blank is on the outside of the container, the paperboard may absorb moisture or bacteria and other microorganisms at the raw edge. If the laminate includes a foil layer to make the container oxygentight, the raw inside edge is also a problem because it provides a path by which atmospheric oxygen can easily enter the container.

A variety of blank constructions and methods of forming or treating blanks have been developed in an attempt to overcome these problems. Several examples of such prior constructions and methods are disclosed in U.S. Pat. Nos. 1,200,803 (Besozzi), 3,058,868 (Schroeder), 3,401,608 (Labombarde), 3,456,863 (Mollison), 3,495,507 (Haas), 3,604,317 (Baun), 3,604,613 (Haas), 3,654,842 (Schwenk), 3,716,435 (Jensen), 3,770,540 (Fuchs), 3,846,220 (Buchner), 4,239,150 (Schadowski et al.) and 4,254,693 (Schadowski et al.), and in U.K. Pat. No. 1,122,346.

One approach to solve the problem of such exposed edges involves removing a portion of the thickness of the laminate along the edge in question and folding the thinned portion in such a manner as to cover the exposed paperboard. This expedient is exemplified by the disclosures of U.S. Pat. Nos. 3,058,868, 3,495,507 and 3,604,317. If the thinned portion is merely folded over itself, a paperboard-paperboard bond must be made to hold the folded-down portion in place. An adhesive is usually necessary for such a bond, requiring an additional manufacturing step (unless the folded portion is held in place by means of the side seam of the final container, which requires that the blank be made into a container immediately). Alternatively, the folded-over portion can be secured to the thermoplastic layer adjacent the cut. This, however, increases the thickness of the blank at the edge in question, requiring additional space for shipping and storage. As mentioned, the blank can be formed into a container before shipment, but the manufacturer of the blanks is ordinarily not the company that fills the containers, and shipping empty containers is highly uneconomical.

The problem of uneven blank thickness can be mitigated by ironing the folded-over portion into the thermoplastic layer to which it is bonded, as disclosed in U.S. Pat. No. 3,604,317. Even with this expedient, however, another problem is encountered in obtaining a good seal when closing the filled container. Because the container side wall has a double thickness of material at the side seam, an exactly circular end closure will not fit perfectly over the end of the container but will leave a small hole adjacent the double thickness. This hole must somehow be closed to achieve a fully reliable seal. This problem is compounded if the end of the container side wall is curled, since the double thickness makes the rim of the container uneven.

It would be desirable to have a blank construction free of these problems and yet economical and simple to manufacture, ship and store.

SUMMARY OF THE INVENTION

It is therefore the principal object of the invention to provide a skived and hemmed web or blank that avoids the problems described above, and a method and apparatus for making it.

Another object of the invention is to provide such a web or blank that can be manufactured easily and economically.

Still another object is to provide a method and apparatus for making such a web or blank cleanly and with less dust than would be possible conventionally.

Still another object is to provide such a web or blank, having at least one protected edge, requiring no adhesives for its manufacture, and capable of being shipped and stored in blank or web form, requiring little or no more space than a similar web or blank with all raw edges.

Yet another object is to provide such a web or blank that, when made into a container, will enable satisfactory membrane, plug or other end closure seals to be reliably and easily obtained.

In one aspect, the invention comprises a thermoplastic-coated paperboard piece of material container blank having at least one edge skived to expose a portion of the paperboard core (hereafter, "piece of material", "sheet of material" and "sheet" are refer, throughout the specification and the claims, to both a web and an individual container blank). The skiving preferably reduces the thickness at the edge considerably, e.g., on the order of 75%. The skived edge portion is bent toward the thermoplastic layer adjacent the edge of the sheet and adhered thereto by heat and pressure. This results in an edge portion somewhat thicker than the material sheet. In order to produce a flat piece of material, the bent over skived portion and the adjacent portion of the sheet are preferably compressed until they are both of a thickness equal to that of the blank. By virtue of this skiving and hemming, the paperboard core of the cut edge is now protected by whatever coating (typically a second thermoplastic layer) is provided on the unskived side of the sheet material. This makes the skived and hemmed edge suitable for use as the inside edge of a container seam.

According to the invention, the edge to be protected is preferably skived twice. One skive produces an approximately flat surface parallel to the surfaces of the sheet. The other, which is preferably separated from the edge by the flat cut surface, produces a formation defining a slope. This formation may be either a simple sloping surface, or a step-like set of flat surfaces each of which is parallel to the sheet surfaces, the edges of the steps defining a sloping plane. The flat and slanted portions preferably meet along a line or are separated by a shoulder or step. The line or shoulder serves as a fold axis about which the folding back of the skived strip is done. If a shoulder is provided, it comprises a vertical wall between the two skived regions. The wedge-shaped edge defined by the skived and hemmed portion can, if desired, be pressed to shift the wedge toward the sheet surface to which the folded-over part is sealed, to make the entire folded-over portion more or less flush with the latter surface.

The skiving operation is preferably carried out by one or more milling wheels having the usual fowardly-inclined cutting teeth. Climb milling is used for cutting the sloped surface, if any. To produce the flat surface or surfaces, however, the material is moved in a direction opposite to the motion of the milling wheel teeth. This method, hereinafter referred to as "opposing milling", has been found to yield a smooth skive. The opposing milling has also been formed to be a cleaner procedure than climb milling, by removing, material from the workpiece in a continuous ribbon rather than as many small pieces of dust or debris. The sloped and flat portions may be skived in either order.

Another aspect of the invention is an apparatus for carrying out the method of the invention. The apparatus preferably comprises two milling wheels disposed to skive a piece of material one after the other. One, rotating in the direction opposite that of web movement, makes a flat surface generally parallel to and more or less adjacent to one edge. The other makes a slanted surface spaced from the edge, by means of climb milling. (Alternatively, the latter may be replaced by a series of milling wheels that each make a flat cut parallel to the sheet surfaces, the cuts so made forming a step-like arrangement whose edges define a sloped plane. In this case, the wheels preferably all rotate in the direction opposite that used for climb milling, to obtain the advantages afforded by opposing milling. The skives can be made in any order. A heating device heats the heat sealable layer of the sheet adjacent the skived portion, and a sealing device folds the skived region parallel to the edge and presses at least a portion of the paperboard core exposed by the flat skive against the heated layer to effect a heat seal hem. If desired, a pre-hemming device may also be provided between the milling wheels and the heating unit to pre-fold the skived portion, after which the folded portion is allowed to spring partway back toward its unfolded configuration.

Other objects and advantages of the invention will be more fully understood from the accompanying drawings and the following description of several illustrative embodiments and the following claims. It should be understood that terms such as "left", "right", "upper" and "lower" used herein are for convenience of description only, and are not used in any limiting sense.

DETAILED DESCRIPTION OF THE PREFERRED EMBODIMENTS

Figure 1:
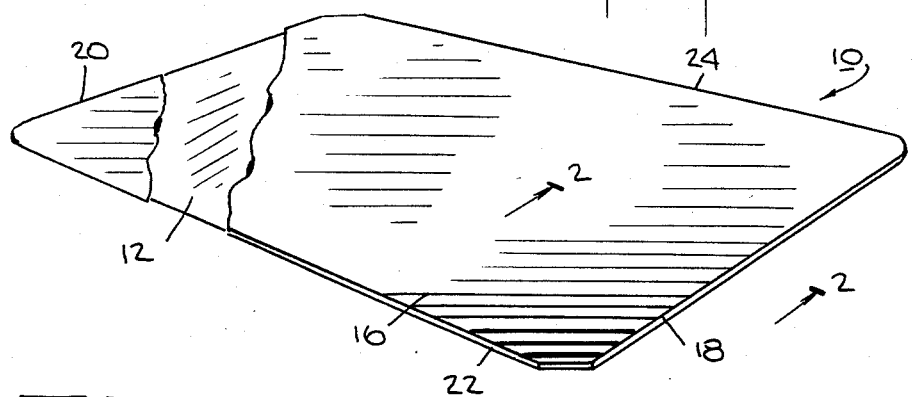
FIG. 1 is a plan view of a typical blank from which a paperboard container is formed.
Figure 2:
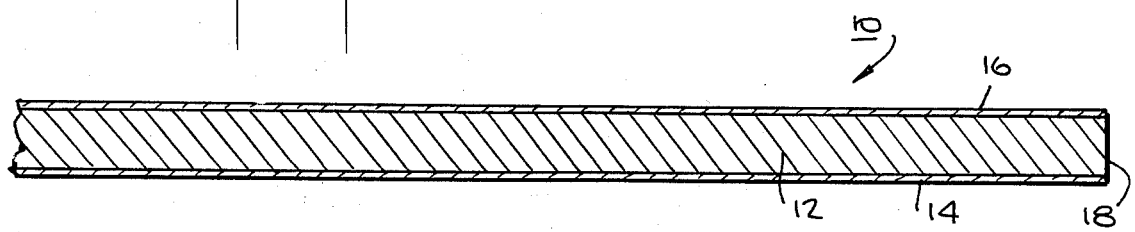
FIG. 2 is a cross-sectional view taken from section line 2—2 in FIG. 1.

FIGS. 1 and 2 show a blank 10 of paperboard or other relatively stiff, resilient and bendable stock material 12 coated on both sides 14, 16 with a thermoplastic such as polyethylene. The blank 10 is adapted to be formed into a tube-type container, as by being bent or wrapped around a mandrel so that two edges (e.g., edges 18 and 20) overlap, and then having the overlapped edges sealed together. Blanks of the type shown are conventionally formed by transversely cutting, as at 18 and 20, webs of coated or laminated stock of indefinite length, such as are shipped in large rolls and unwound for cutting. Alternatively, the blanks may be formed by such transverse cuts immediately after formation of the stock material. The cut edge 18 of the blank is to be skived and hemmed according to the invention. If desired, the other cut end 20 can also be treated, as could one or both of the other edges 22 and 24. Although not indicated in the figures, it is common to make one thermoplastic layer 14 (hereinafter termed "the bottom layer" for convenience), intended to become the interior of the container, thicker than the other thermoplastic layer 16.

Figure 3:
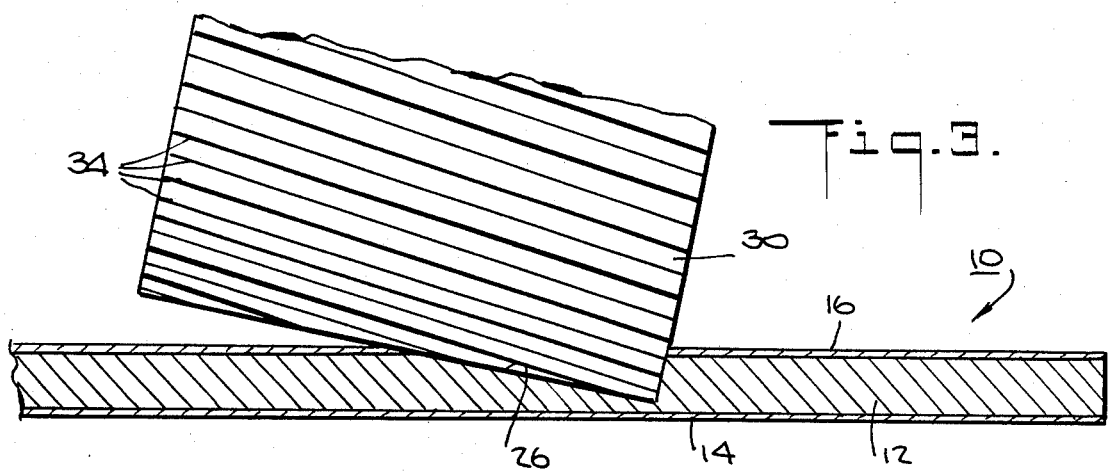
FIG. 3 is a view similar to FIG. 2 and shows one skiving step in the method of the invention.
Figure 4:
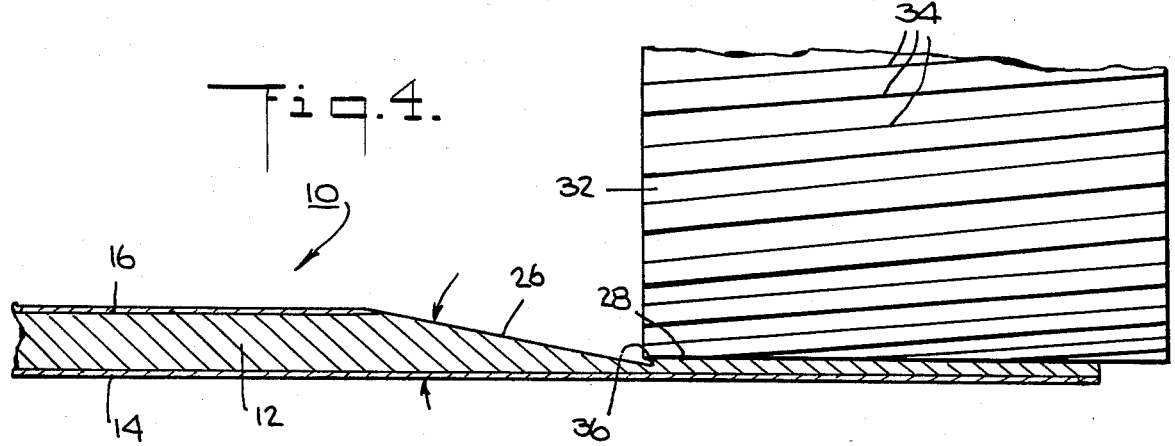
FIG. 4 is a view similar to FIG. 2, showing another skiving step.

FIGS. 3 and 4 illustrate two steps of one version of the method of the invention.

According to the invention, the upper surface of the blank 10 is skived twice: once to produce a cut surface 26 oblique to the top and bottom of the blank 10 (FIG. 2) and once to produce a flat cut surface 28 parallel to the blank surfaces (FIG. 3). Both cuts are made with rotating milling wheels 30, 32 having oblique (i.e., non-paraxial) teeth 34, as described below, and extend parallel to the edge 18. In the preferred version of the invention illustrated, the lower side of the oblique cut surface 26 extends somewhat deeper into the paperboard core 12 than does the flat cut surface 28, defining a shoulder 36 or step between them. In the region of the flat cut surface 28, the skived blank is preferably as little as 25% (or even less) as thick as in the unskived region, although this thickness can be varied substantially as desired without departing from the scope of the invention. As shown, the plane of the oblique cut surface 26 preferably makes an angle of less than 30°, and most preferably less than 10°, with the planes of bottom and top layers 14 and 16. (This angle is measured as shown in FIG. 4).

As indicated, the two milling wheels 30, 32 preferably rotate in opposite directions. The wheels 30 used for the oblique cut rotates so that its teeth 34 strike the material 10 while moving in the same direction as the latter ("climb milling"), while the flat cut 28 is made using opposing milling. It has been found that the use of opposing milling for flat or nearly flat cuts is highly advantageous, as the waste material forms a continuous ribbon, rather than dust, as with climb milling. In addition, opposing milling produces a far smoother cut surface than is obtainable with climb milling, since the milling wheel contacts only unskived portions of the paperboard instead of chomping over already-skived paperboard. Another advantage is that a greater speed of skiving is obtained, the speed of skiving being the sum of the speeds of the motion of the paperboard along the conveyor and the peripheral speed of the milling teeth of the second milling wheel. The continuous removal of dust and ribbon from the skiving operation is particularly important in aseptic packaging.

The two cuts may be made in either order, although it has been found somewhat easier to make the oblique cut first.

After skiving, the material is folded along a line between the two skived regions, defined by the shoulder 36 in the version shown in FIGS. 3 and 4. The flat cut area is folded counterclockwise (in the view shown) about the shoulder 36 to overlap the unskived region, to which the flat cut surface 28 is then heat sealed, as described below.

It has been found that the use of a milling wheel for the purpose of reducing the thickness of an edge of a paperboard laminate produces an undesired effect on that part of the blank which is adjacent to the skived edge. The shoulder 36 performs the additional function of isolating the effect of the second milling wheel 32 on the material.

Figure 5:
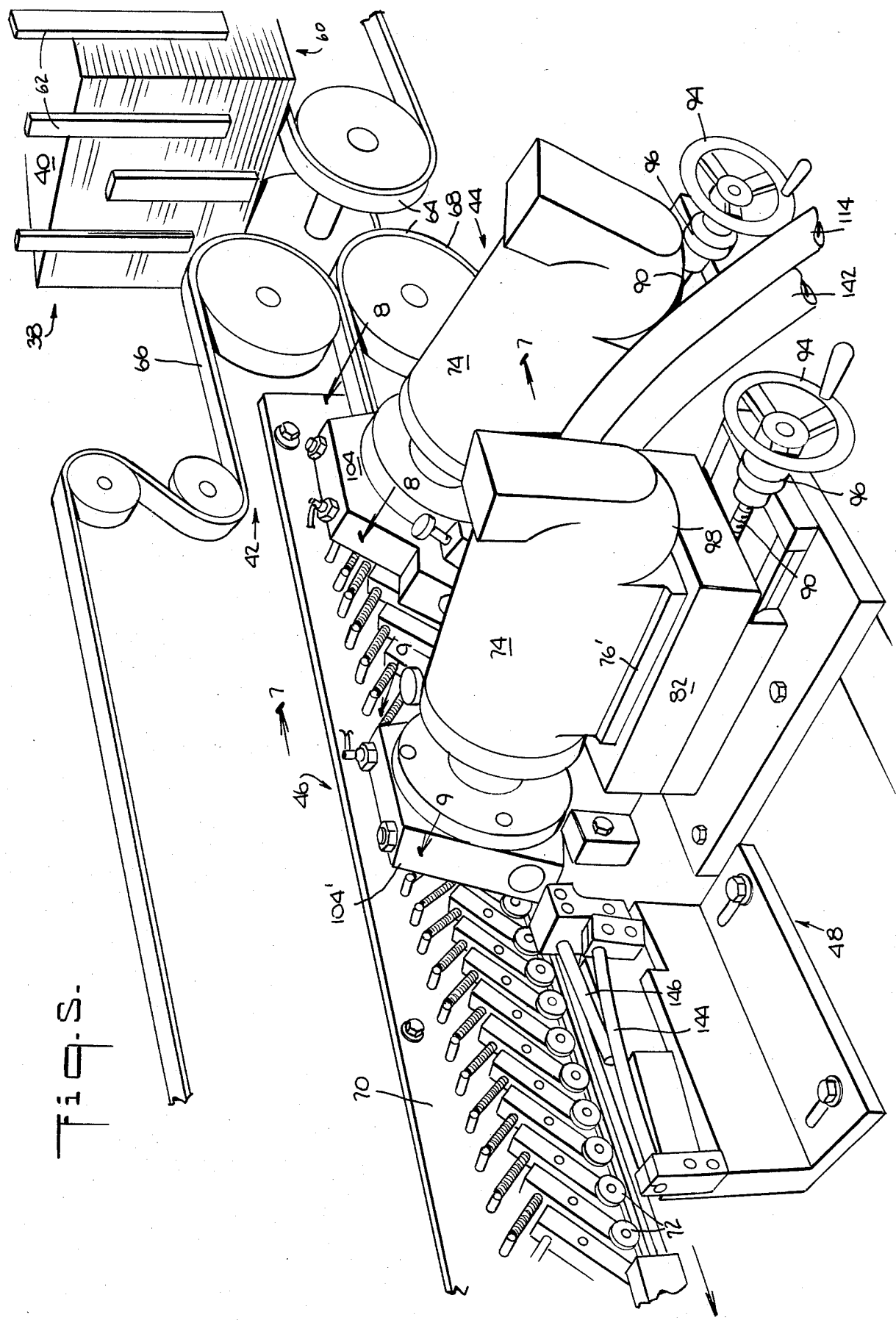
FIG. 5 is an overall perspective view of the preferred embodiment of one portion of the apparatus of the invention.
Figure 6:
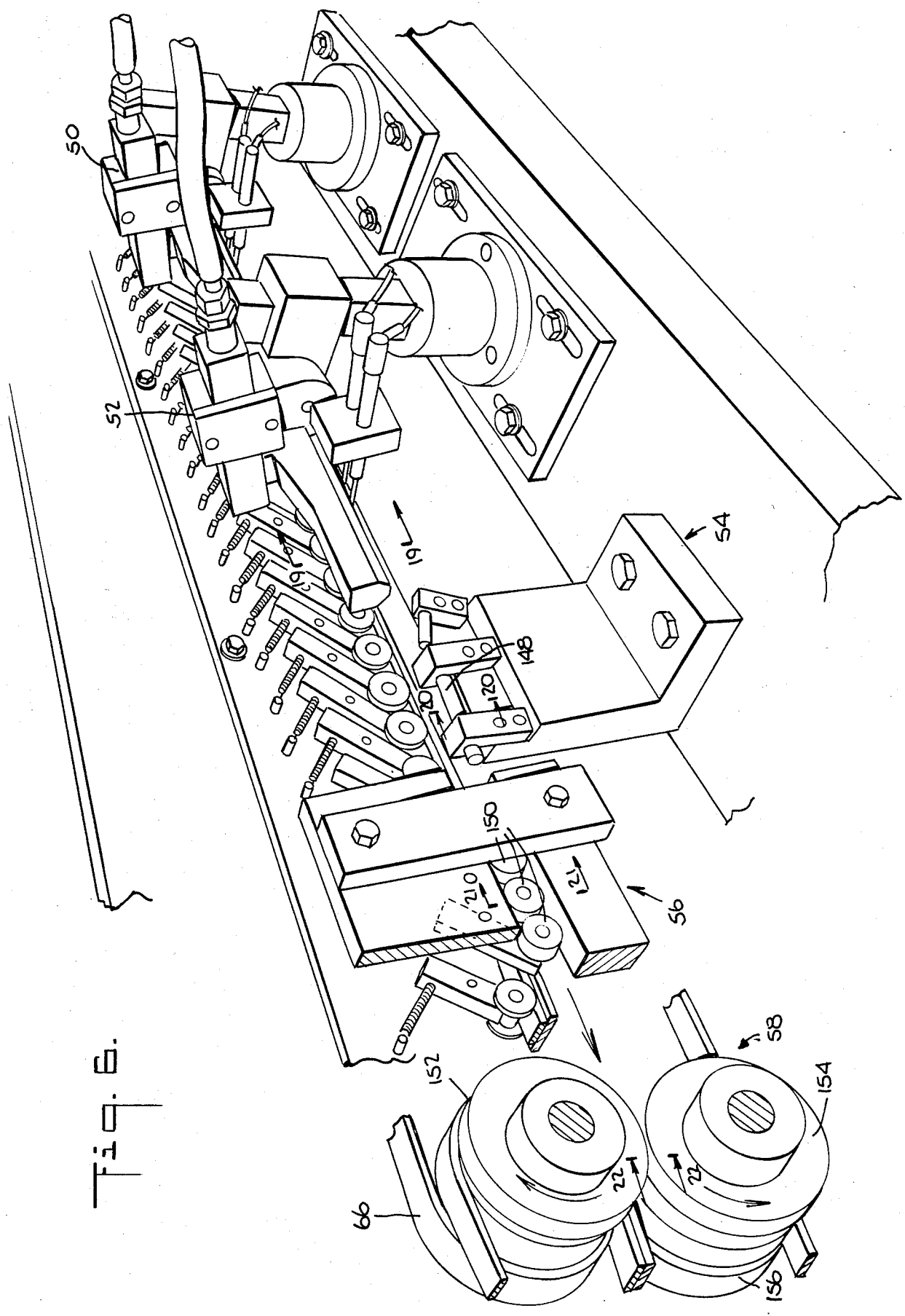
FIG. 6 is a perspective view of the rest of the embodiment of FIG. 5.

FIGS. 5 and 6 show the preferred embodiment of the apparatus of the invention, which includes: a feeding mechanism 38 for feeding blanks 10 from a supply stack 40; a conveyor and hold-down system 42 for moving the blanks 10 through the machine; first and second milling stations 44 and 46, which in the illustrated embodiment are respectively for producing the oblique and the flat cut surfaces indicated in FIG. 4; a pre-hemming device 48 for prefolding the skived edge before heating and hemming; two heaters 50 and 52; a hemmer 54, including a sealing-pressure mechanism 56; and an ironing and wedge-shifting mechanism 58, whose purpose is explained below.

A conventional hopper 60 defined by vertical bars 62 contains a supply stack 40 of blanks 10 like that shown in FIG. 1. The edge 18 of each blank 10 to be skived and hemmed is on the near side (as seen in FIG. 5) of the hopper 60. The blanks 10 are fed out one at a time from the bottom of the stack by belts 64.

Upper and lower belts 66, 68 grip the blank 10 between them and convey it through the machine. A vertical plate 70 carries a series of hold-down rollers 72 spring-biased to urge the upper belt 66 downward. Each of the two milling stations 44, 46 (see FIGS. 5 and 7-11) comprises an obliquely-toothed milling wheel of known design, disposed in a trapezoidal housing and driven by a suitable precision motorized spindle. The spindle 74 of the first milling station 44 is mounted to the oblique top surface of a wedge-shaped block 76, as by bolts 78. The wedge-shaped block 76 is secured, as by bolts 80, to the top of a second block 82. A third block 84, secured as by bolts 86 to the machine frame 88, supports the second block 82. The upper surface of the third block 84 and the lower surface of the second block 82 have threaded semi-cylindrical grooves in which an adjustment rod 90 is threadedly received. The end of the rod 90 nearer the blank path is received rotatably in a socket 92 provided for it in a raised portion of the third block 84, and a crank wheel 94 is disposed at the other end to facilitate rotating the rod 90. Turning the crank wheel 94, as will be understood, moves the milling wheel 30 in either direction along a horizontal path perpendicular to that of the blanks, to adjust the distance of the oblique cut surface 26 from the blank edge 18. A dial 56 on the rod 90 beside the crank wheel 94 indicates the linear movement of the milling wheel 30. The second milling station 46 is mounted similarly, except the upper surface of the block 76 directly bearing the motor housing of the second milling unit 46 is horizontal.

Figure 7:
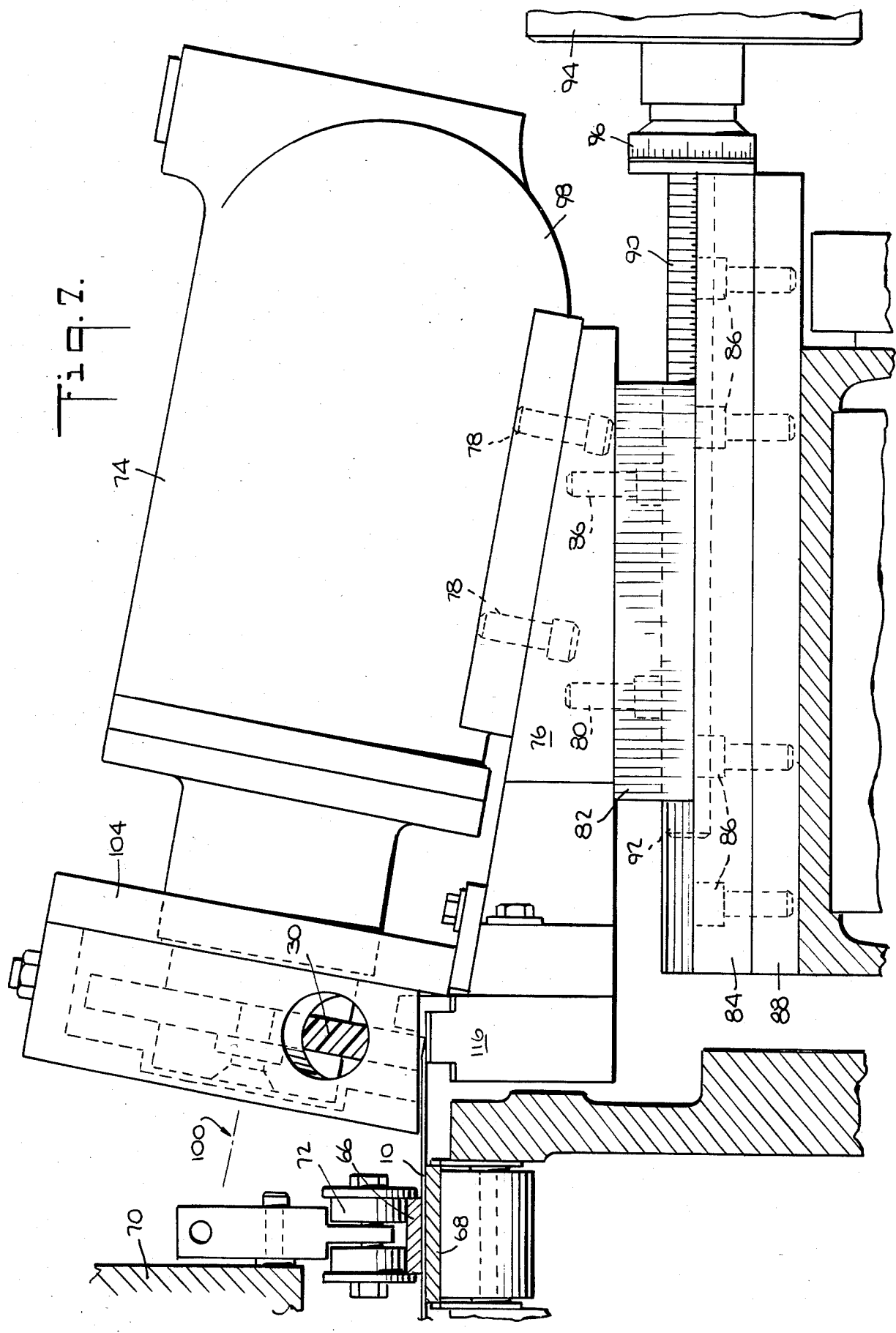
FIG. 7 is a detail taken from line 7—7 in FIG. 5.
Figure 8:
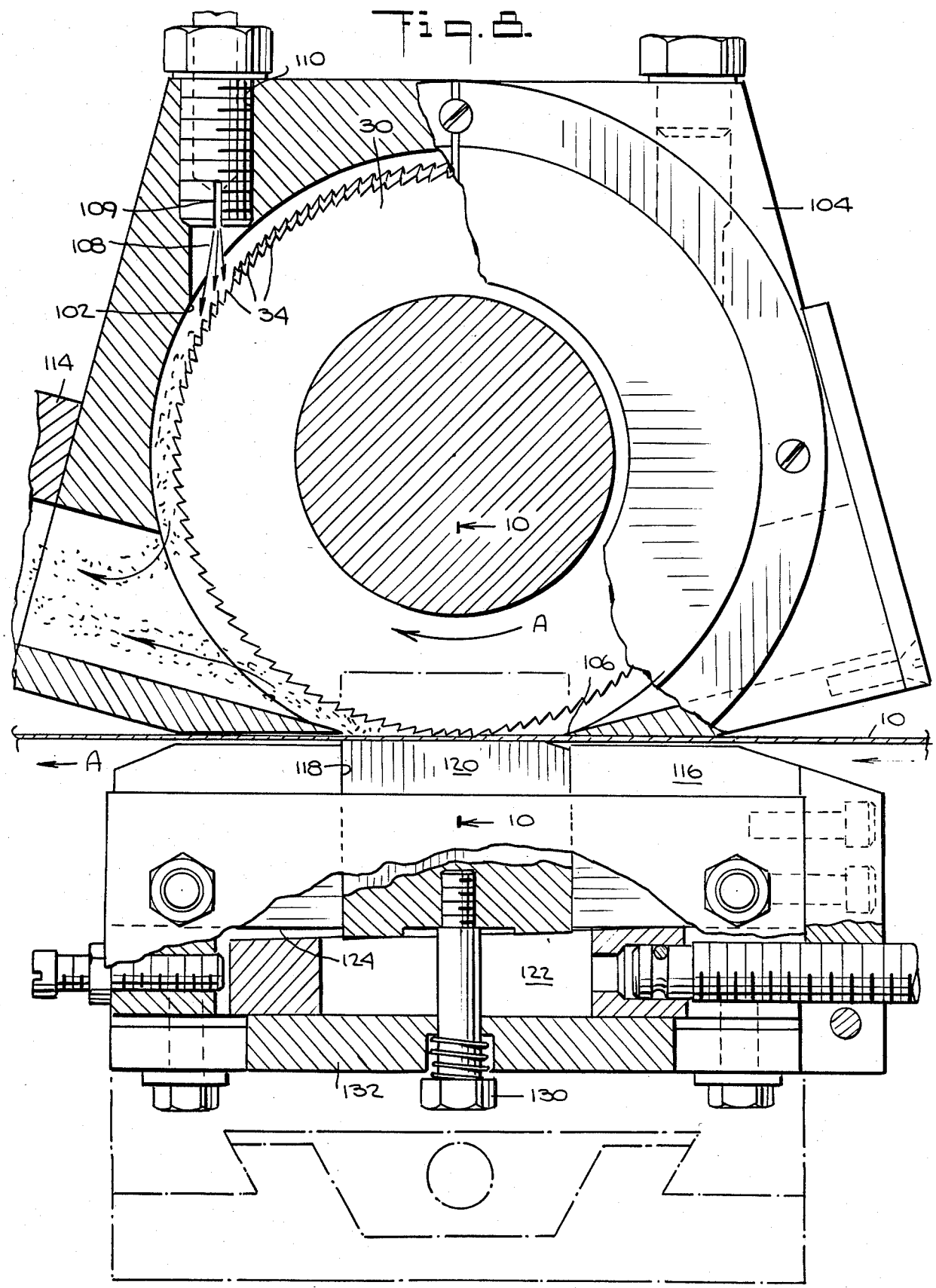
FIG. 8 is an end view, partly in section, of the apparatus shown in FIG. 7.

As shown in FIGS. 7 and 8, the first milling wheel 30 is mounted for rotation about an oblique axis 100 and is located in a cylindrical cavity 102 in the approximately trapezoidal housing 104. The blanks 10 pass beneath an opening 106 in the housing through which they are exposed to the milling wheel 30. As indicated by the arrows A, the milling wheel 30 rotates so that its teeth 34 strike the blanks 10 while moving in the same direction as the latter. This type of milling, known as climb milling, produces waste in the form of dust, which is thrown off from the milling wheel 30. A slit-shaped jet of air 108 is oriented and shaped to aim at and clean out the spaces between the cutting teeth 34 of the milling wheel 30. The air jet 108 is produced by a nozzle 109 mounted in a bore 110 communicating with the cylindrical cavity 102. The debris 112 knocked free by the air jet, together with that thrown clear of the wheel 30, is drawn out of the housing by vacuum suction via an exhaust line 114 (see FIG. 5). The exhaust line 114 is located on the downstream side of the first milling station 44, since that is where the debris is produced.

Figure 10:
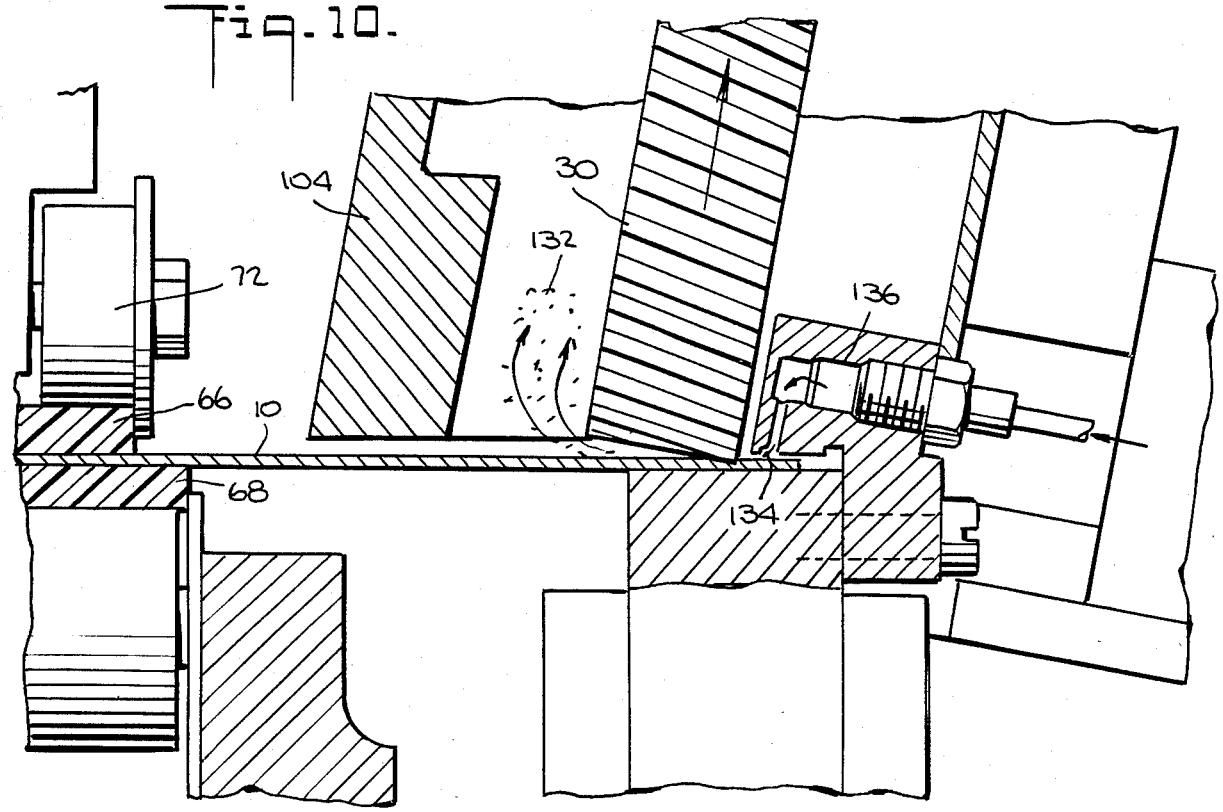
FIGS. 10 and 11 are sectional views taken from section lines 10—10 and 11—11 in FIGS. 10 and 11, respectively.

Beneath the housing 104 is a lower block 116 having a central cavity 118 or bore in which a support block 120 is slidably received. The blanks 10 are borne upward against the milling wheel 30 by the support block 120 during milling. The support block 120 rests on the oblique upper surface of a wedge-shaped adjustment block 122 that is horizontally slidable in a cavity 124 in the lower block 116. One side of the adjustment block 122 is secured to one end of a rod 126 threadedly and rotatably received in a threaded aperture 128 in the side of the lower block 116. Rotation of the rod 126 adjusts the lateral position of the adjustment block 122 and, thereby, the elevation of the support block 120. A bolt 130 having one end secured to the support block is spring-biased downward from a plate 132 defining the bottom of the adjustment block cavity 124. Proper choice of the support block elevation ensures that the material is skived accurately. If desired, vacuum suction could be applied to the material via apertures that could be provided in the support block. As indicated in FIG. 10, air pressure is applied to the upper surface of the sheet material via apertures 134 supplied with air via a supply line 136 that passes through the side of the trapezoidal housing 104 remote from the material path.

Figure 9:
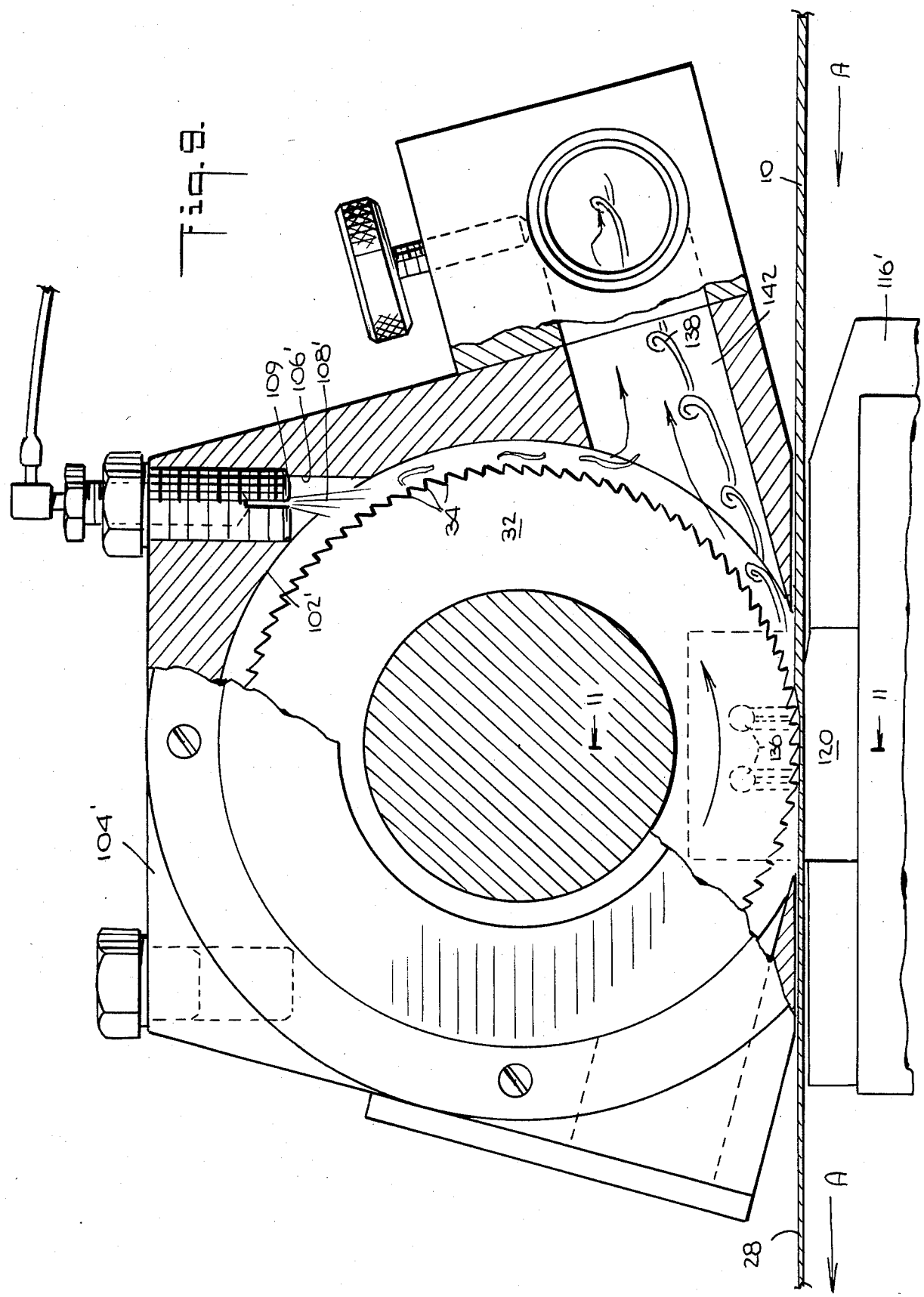
FIG. 9 is a view similar to that of FIG. 8, showing another part of the apparatus of FIG. 5.
Figure 11:
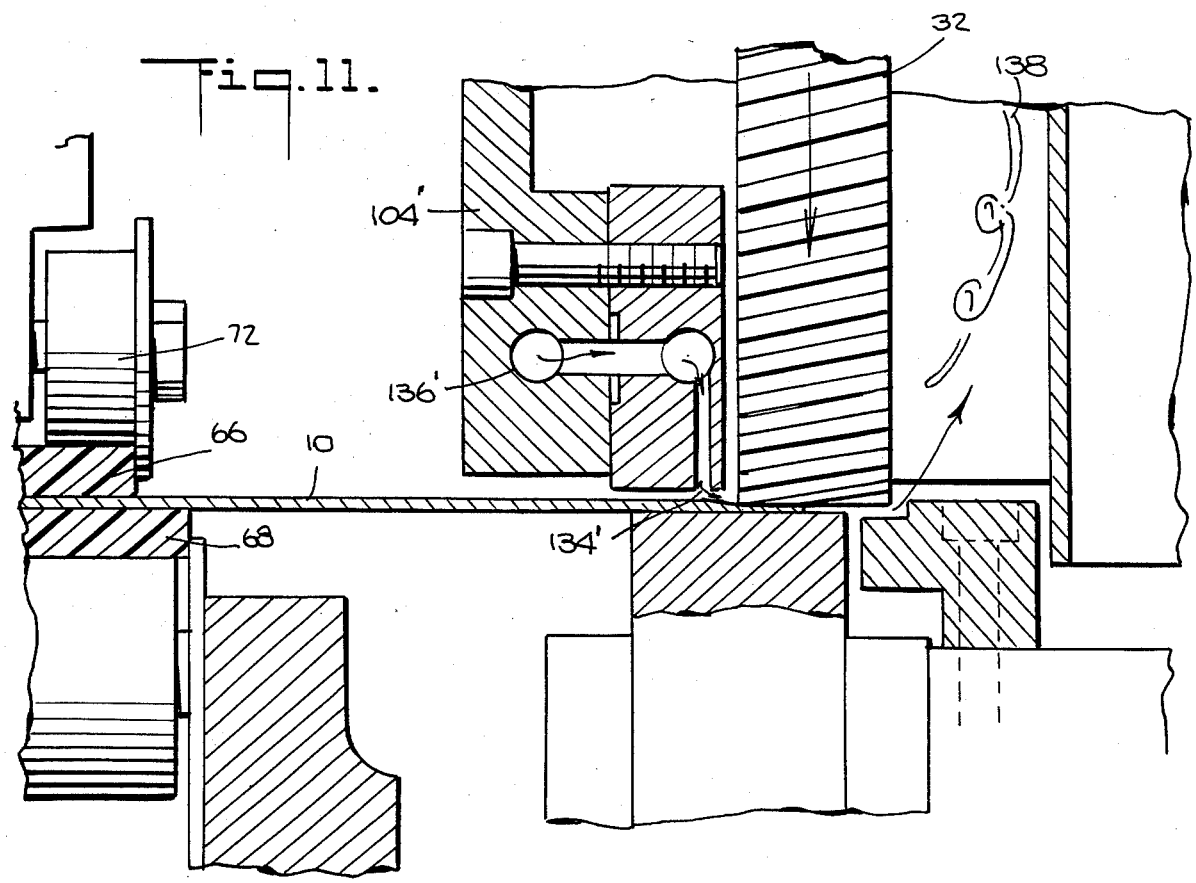
Figure 12:
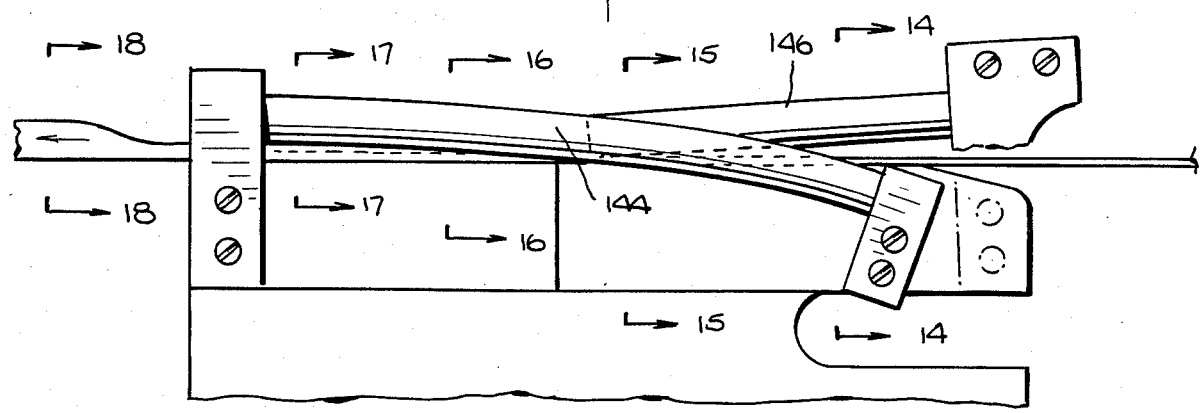
FIGS. 12 and 13 are side and plan views of one portion of the embodiment of FIG. 6.
Figure 13:
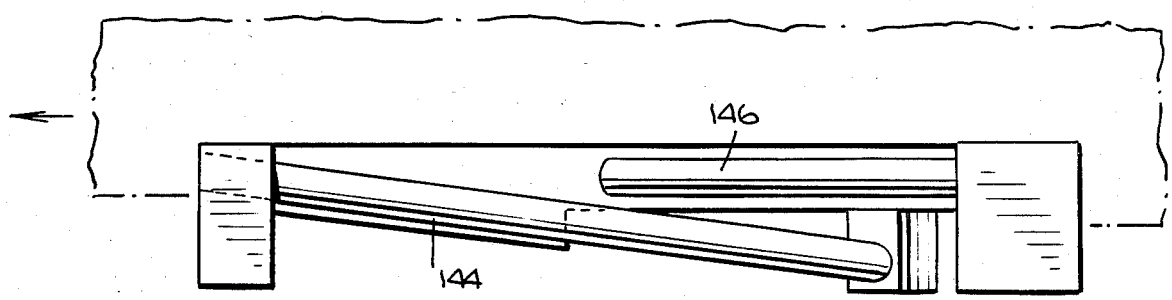
Figure 14:
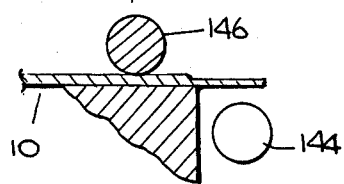
FIGS. 14-18 are views taken from lines 14—14 through 18—18 of FIG. 12, illustrating the operation of the apparatus shown in FIGS. 12 and 13.
Figure 15:
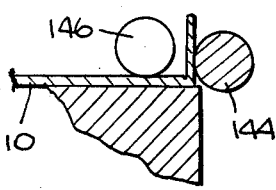
Figure 16:
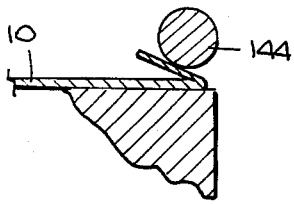
Figure 17:
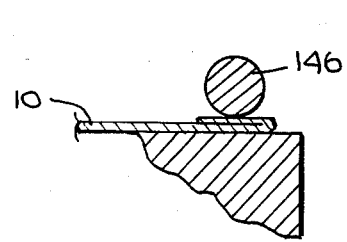

The second milling station 46, shown in FIGS. 9 and 11, is largely the same as the first except as otherwise stated herein. The chief differences, already noted, are the horizontal rather than oblique axis of rotation, and the direction of rotation, of the second milling wheel 32. The opposing milling performed by the second milling unit 46 produces a ribbon of waste material 138 and a relatively small amount of particulate debris 140. This waste material, produced at the upstream side of the second milling wheel 32, is removed by an adjacent vacuum tube 142. A support block like that in FIG. 8 is provided. Because the flat cut surface 28 skived by the second milling unit 46 is to be located at the edge of the sheet material, the air jets 134' are located on the side of the housing 104' nearer the center of the material path, as shown in FIG. 11.

Figure 18:
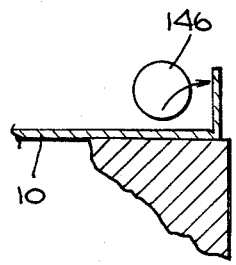

The pre-hemming mechanism 48, shown in FIGS. 12-18, comprises two rods 144, 146. Rod 144 is bent so as to serve as a guide that folds the skived edge at the desired point, and rod 146 holds the blank 10 down to permit the folding. As can be seen, the outer rod 144 gradually rises, raising the edge portion, while the portion of the material adjacent the oblique skive is held down by the inner rod 146. As a result, the edge is folded up about 90°. Past the point shown in FIG. 15, the inner rod 146 ends, and the outer rod 144 bends inward to fold the edge over as far as it will go (approximately 180°). When the material proceeds past the pre-hemmer 48, as shown in FIG. 18, the folded-over portion springs about halfway back toward its original position.

Figure 19:
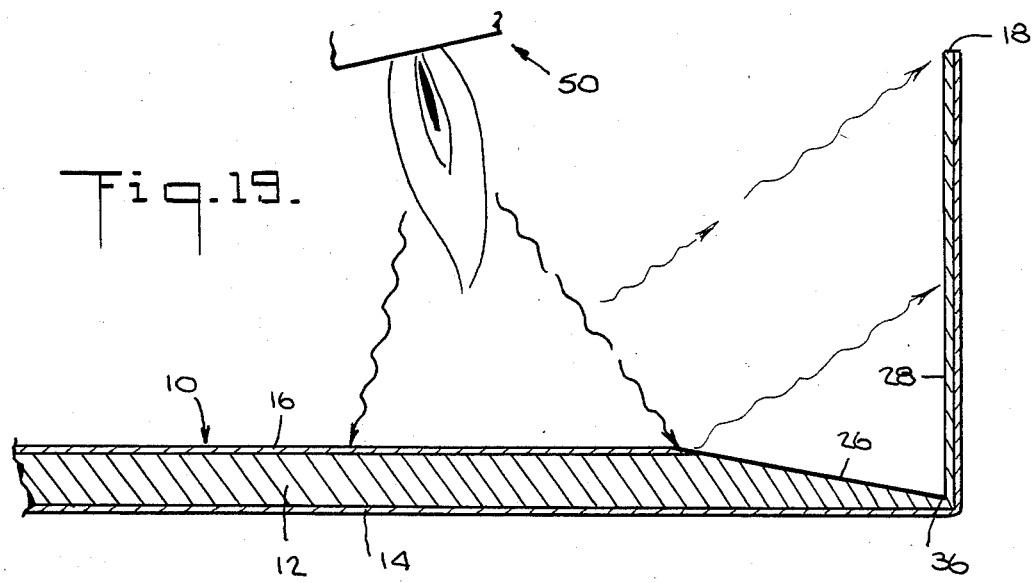
FIGS. 19-21 are views taken from lines 19—19 through 21—21 of FIG. 6, and illustrate additional steps of the method of the invention.

The next step in forming the final hemmed edge of the container blank of this invention is illustrated in FIG. 19. Two precision gas flame heaters 50, 52, each of which provides a fine line of flame, are used to heat the pre-hemmed material. As indicated, the portion of the thermoplastic layer 16 adjacent the skived portion of the material is heated. Some heating of the prefolded flap may also occur, and this is beneficial provided no scorching takes place. The heat should also be controlled to ensure that only the upper layer 16 is activated, and not the lower layer 14 as well. (Only one of the heaters 50, 52 may be required, depending on the speed of the material 10 through the machine, which can be as high as 600 feet per minute and, it is believed, can be made at least as great as 1000 feet per minute.) In place of open-flame heating, any other convenient method, such as hot air jets or induction heating (the latter being possible if metallic foil is one of the laminate layers of the blank), can be used.

Figure 20:
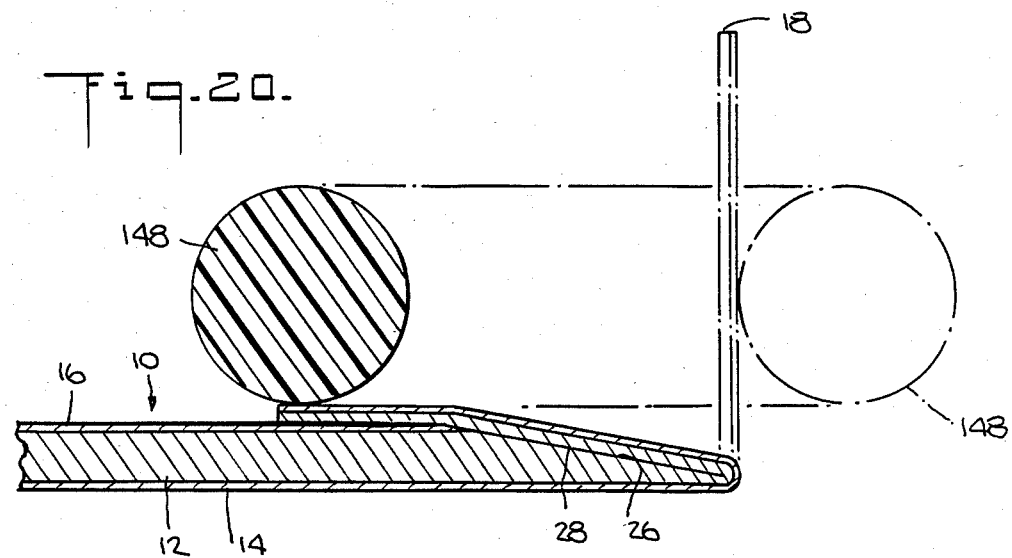

The hemming or sealing unit 54, as shown in FIGS. 6 and 20, comprises a rod 148 bent to serve as a guide to force the flap down onto the heated portion of thermoplastic layer 16 and to press the two layers together sufficiently hard to produce a heat seal between them. (In actuality, only a tack seal is likely to be obtained with rod 148 as illustrated, but if the rod 148 or an equivalent element is made sufficiently long and exerts sufficient pressure on the material, a satisfactory final seal can be obtained, permitting the sealing rolls 150 described below to be dispensed with.) FIG. 20 indicates in phantom the location of the upstream end of the hemming rod 148 relative to the material path.

The sealing pressure mechanism 56 (FIGS. 6 and 21) comprises a series of downward-biased rollers 150 disposed over the material path. The rollers 150 press the tack-sealed hem to ensure that the seal will be permanent. The rollers 150 also ensure a permanent seal by providing a sufficient contact time, and they allow the seal to cool. This is especially important for operating the apparatus of the invention at high speeds (e.g., 600 feet per minute or higher). As already stated, the rollers 150 could be replaced by an extension of rod 148, or by any element that could be weighted or otherwise biased against the material to provide the necessary pressure, such as a weighted rod or plate. In the hemmer 54 and sealing pressure mechanism 56, it is important that the machine elements that contact the heated material be made of a non-stick substance (e.g., Teflon or Teflon-coated metal).

Figure 21:
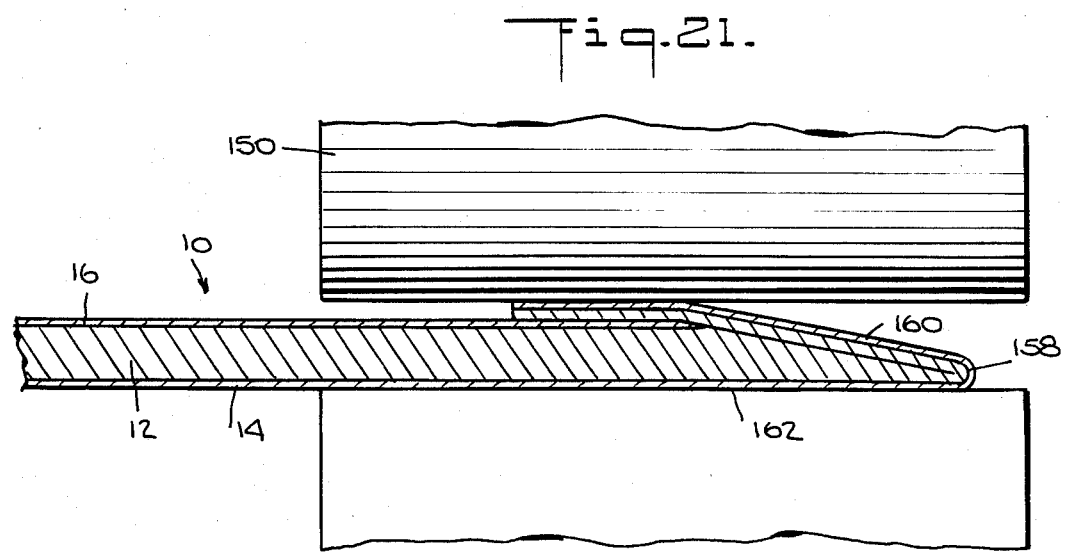
Figure 22:
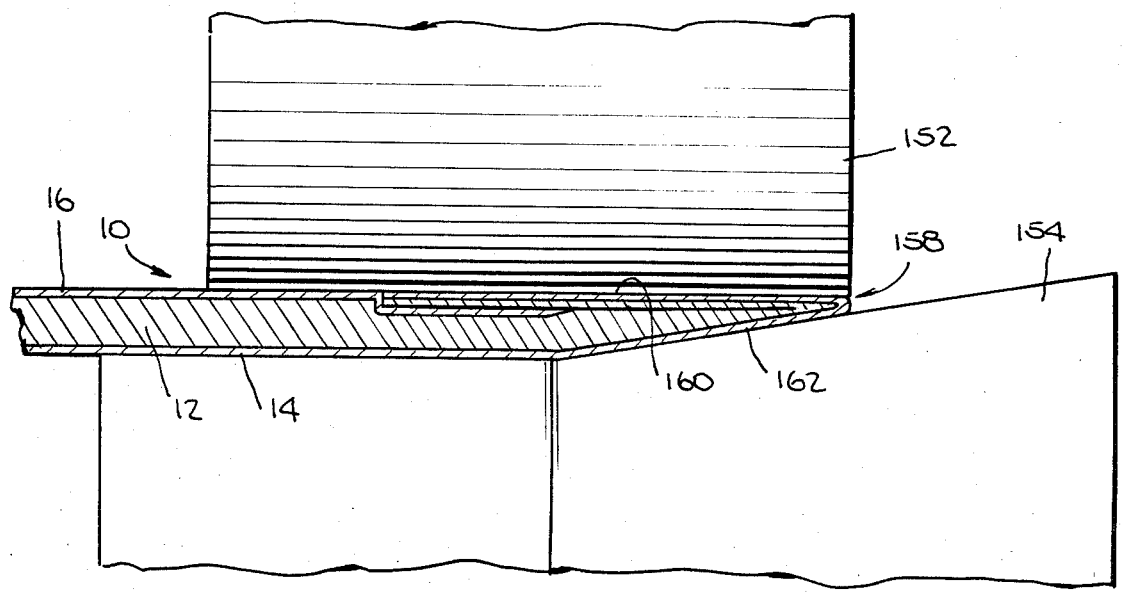
FIG. 22 shows the operation of the ironing and wedge-shifting apparatus.
Figure 23:
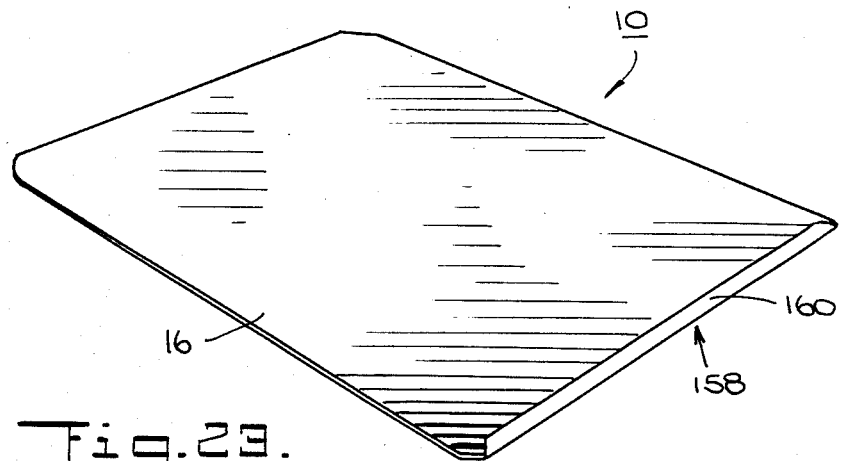
FIG. 23 is a perspective view of a blank having a skived and hemmed edge according to the method of the invention.
Figure 24:
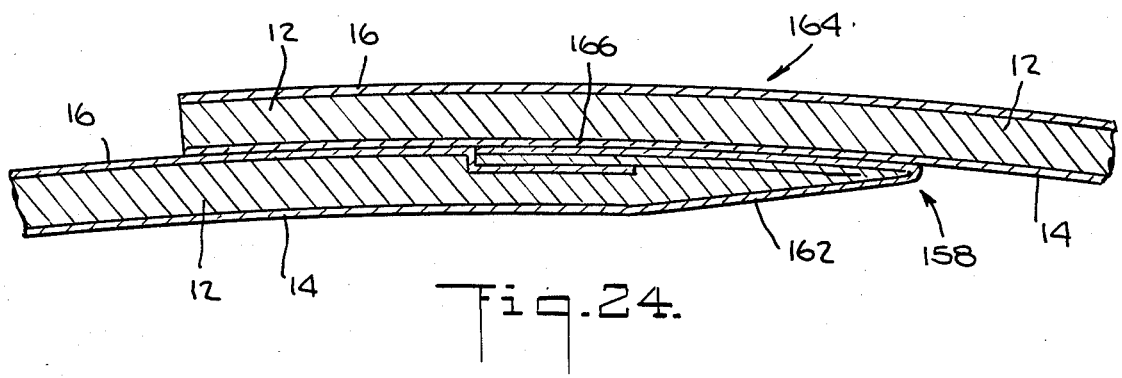
FIG. 24 is a sectional view of a seam such as can be used in making a paperboard can from the blank of FIG. 23.

FIGS. 6 and 22 show the ironing and wedge-shifting station 58. This comprises a pair of heavy driven rollers 152, 154 mounted coaxially with two of the pulleys 156 (only one of which is shown) on which the belts 66, 68 ride and are driven. The upper roller 152 has an even, cylindrical circumference while the lower roller 154 flares conically in the portion most distant from the center of the material path. As shown in FIG. 21, after sealing and just before entering the nip between the ironing and wedge-shifting rollers 152, 154, the skived and hemmed edge of the material has a wedge-shaped profile 158, having its top surface 160 oblique to layer 16 and its under surface 162 flush with layers 14. FIG. 24 is a cross-sectional view from above or below of the side seam of a can 164 made from a blank 10 (see FIG. 23) skived and hemmed according to the invention. The container 164 has an inside seam 166 formed by overlapped right and left ends of the blank 10. These overlapped portions form a seam running the length (height) of the container. The application of heat and pressure bonds facing thermoplastic layers 16 and 14 together, thereby forming the seam 166. The treated edge 18 is completely covered with thermoplastic layer 14, so that the paperboard core 12 cannot come into contact with the container contents. As can be seen, the "upper" surface 16 of the blank is the container exterior. It is therefore desirable for the radially outer portion of the underlapping edge to be flush against the interior surface 14 of the overlapping edge 20. To achieve this result, the wedge-shifting rollers 152, 154 are used to bend the edge portion of the skived and hemmed material upward so that its upper surface 160 becomes substantially flush with layer 16.

As the hemmed material passes through the ironer 58, the folded-over part is pressed down into the underlying material until substantially flush with the original upper surface 16. Gap between rollers 152 and 154 is set smaller than original thickness of the blank to compensate for spring back of the paperboard, which occurs after the hem and paperboard are compressed. This step makes the finished material nearly completely flat, so that it requires no more storage or shipping space than the original, untreated material. Moreover, the method of the invention provides this result without the messy expedient of applying an adhesive, and the hem so made will be permanent without the material's being made into containers at once.

It will also be appreciated from FIG. 24 that the wedge-shaped edge portion will fill the approximately triangular hole that would occur when the end of a container made with a conventional, blunt edge is closed with a plug or a can-type metal end. In addition, if one end of the container sidewall is curled and then sealed with a membrane or film, the double thickness at the side seam makes the container rim uneven, producing a hole beneath the membrane at the side seam. The method of the invention fills the usual hole, permitting a good seal to be made with conventional membrane-applying techniques.

If the laminate material includes a foil layer adjacent the bottom layer 14 (and typically adhered to the paperboard core 12 by means of a polyethylene or similar intermediate layer), the skived and hemmed edge will cause foil in the overlapped and underlapped edges of the blank at the side seam to be very close, the two piles of foil being separated only by twice the thickness of layer 14. This reduces the width of the path for oxygen to enter the container through the side seam.

Figure 25:
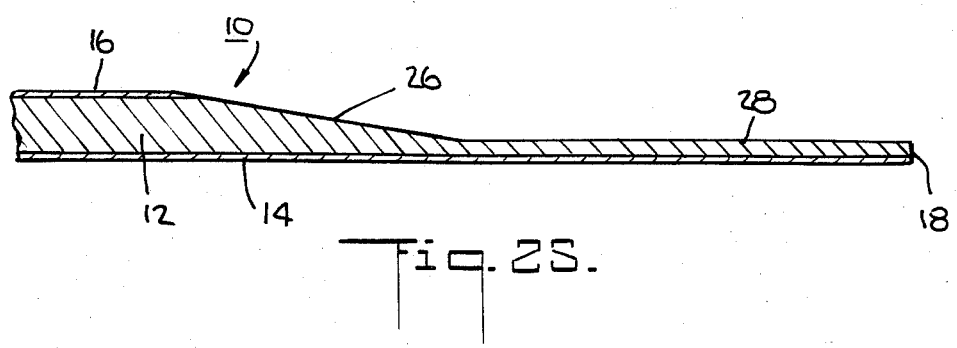
FIGS. 25 and 26 are sectional views, similar to that of FIG. 2, of a piece of material skived according to other variations of the method of the invention.
Figure 26:
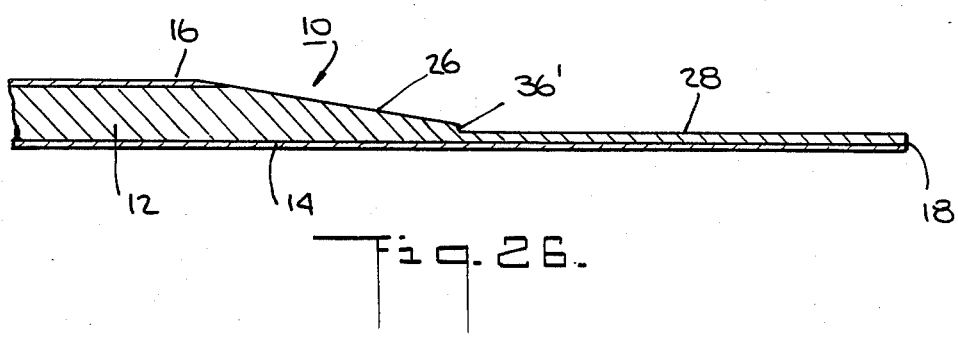

FIGS. 25 and 26 show two variations of the skived edge 18. At the conclusion of the milling steps illustrated at FIGS. 3 and 4, the edge 12 of blank 10 has a tilted surface 26, a shoulder 36 and a flat surface 28 on the paperboard core portion 12. If desired, the milling wheel 30 of FIG. 3 may be used to mill away the paperboard core portion 12 to such an extent that the junction of tilted surface 26 with the flat cut surface 28 contains no shoulder (FIG. 25). In the embodiment of FIG. 26, the oblique cut surface 26 does not extend as far into the paperboard core 12 as the level of the flat cut surface 28, resulting in a shoulder 36' at the junction between the oblique and the flat cut surfaces. The shoulder 36' serves the same function as shoulder 36 of FIG. 4, namely, as a line along which the folding of the edge 18 takes place. These two embodiments are hemmed, ironed and employed in the same manner as the first described embodiment.

As will be apparent to those skilled in the art, many variations of the disclosed preferred embodiments within the scope of the invention are possible. For example, more than one edge of the material can be skived and hemmed according to the method of the invention. In particular, it would be advantageous to skive and hem the two opposite edges that will ultimately be overlapped at the side seam of the container. If the wedge at the underlapped edge is shifted as described above, the side seam region will be only slightly thicker than a single layer of the unskived paperboard. This minimizes the nonsmoothness of the container's shape, and further facilitates obtaining a good seal when affixing an end closure.

The ironing could be done with a series of rollers like rollers 150, each roller providing a smaller clearance for the material than the proceeding roller in the series. The last roller in the series would provide a clearance approximately equal to or less than the thickness of the original blank 10.

If desired, it is possible to dispense with the pre-hemming unit. It is also possible to shift the region of oblique surface 26 upward prior to sealing, to make the configuration of the resultant wedge shaped edge portion 158 of still better definition. This variant may therefore prove to be preferable.

As noted above, the skiving speed is greater with opposing milling than with climb milling, for a given speed of material through the machine. If it is desired to exploit this fully, the sloped cut surface made by climb milling in the above-described embodiments can be replaced by a set of parallel flat skived surfaces, preferably made by opposing milling, forming a step-like structure, so dimensioned that the edges of the steps define a sloped planar geometric surface.

The invention is expected to be used with paperboard laminates covered on both surfaces with a thermoplastic material. All that is really essential, however, as far as concerns the invention, is that the surface that will become the interior of the container be impervious to the product with which the container is to be filled, and that the portion of the outer surface adjacent the skived region be capable of being heat-sealed to the paperboard core of the laminate and, preferably, to the impervious substance on the other side of the laminate.

The angle between the plane of the upper laminate surface (the surface to be skived) and the sloping plane defined by the adjacent skived surface has been described as being preferably less than 30°. The angle can be given any value (greater than zero) desired, and the quality of the final container will generally increase as the angle is made smaller. A smaller angle, however, requires a wider sloped surface, and therefore a wider skived region and edge portion, increasing the width of the web or blank required for a container of a given size. The choice of the angle, therefore, in a compromise between quality (smaller angle) and cost.

The illustrated preferred embodiment of the apparatus of the invention has a climb milling wheel whose axis of rotation is at a fixed angle to the horizontal. This prevents accidental misadjustment of the angle by unskilled personnel. Alternatively those skilled in the art can readily modify the illustrated design to include a device for adjusting the angle.

It will be noted that the symmetric arrangement of the two milling assemblies enables the skiving units to be easily moved from one side of the conveyor frame to the other, according to need.

Although the invention has been described above by reference to several preferred embodiments, many additional modifications and variations thereof will now be apparent to those skilled in the art. Accordingly, the scope of the invention is to be limited not by the details of the illustrative embodiments described herein, but only by the terms of the appended claims.

What is claimed is:

1. A method for skiving and hemming a piece of sheet material having a paperboard layer and having first and second outer layers of heat sealable material respectively constituting first and second outer surfaces of said piece of material, said method comprising the steps of:

milling a portion of said first outer surface, using climb milling, to form an oblique cut surface generally parallel to an edge of said piece of material and defining an angle of less than about 30° with the plane of said first layer of heat sealable material;

milling another portion of said first outer surface, using opposing milling, to form a flat cut surface substantially parallel to said layers of heat sealable material and lying between said oblique cut surface and said edge; said flat and said oblique cut surfaces being separated by a shoulder;

folding said piece of material along said shoulder and pressing a portion of said flat cut surface against said first layer of heat sealable material under conditions effective to form a permanent, at least liquid-tight seal between said flat cut surface and said first layer of heat sealable material, thereby defining a wedge-shaped edge portion of said piece of material.

2. The method of claim 1, further comprising the step of pressing said wedge-shaped edge portion to cause the entire folded-over surface thereof to become substantially flush with said first surface.

3. A method for skiving and hemming a piece of sheet material having a paperboard layer and having at least one surface layer of heat sealable material constituting at least one region of one surface of said piece of material, said method comprising the steps of:

cutting into said paperboard layer and removing a portion of said paperboard layer together with any overlying portion of said layer of heat sealable material, to define an oblique cut plane inclined at an angle to the plane of said layer of heat sealable material, and cutting into said paperboard layer and removing a portion of said paperboard layer together with any overlying portion of said layer of heat sealable material, to define a flat cut surface along an edge of said sheet material substantially parallel to said layer of heat sealable material, to define a flap generally parallel to an edge of said piece of material; and folding said flap along a line generally parallel to said edge of said piece of material and lying between said oblique cut plane and said flat cut surface, to bring a portion of said flat cut surface into contact with said oblique cut plane and another portion of said flat cut surface into contact with said layer of heat sealable material and pressing said flap against said layer of heat sealable material under conditions effective to make a seal therebetween, thereby to define a wedge-shaped edge portion.

4. The method of claim 3, further comprising ironing said flap into the portion of said layer of heat sealable material to which said flap has been sealed, until the exposed surface of said sealed, ironed flap is substantially flush with said layer of heat sealable material.

5. The method of claim 3, wherein the flat cut surface is between said oblique cut plane and said edge before said folding step is performed.

6. The method of claim 3, wherein said oblique plane is defined by an oblique cut surface and wherein said cutting step is performed in such a manner as to define a shoulder between said cut surfaces.

7. The method of claim 6, wherein said cutting step is performed in such a manner as to make the deepest portion of said oblique cut surface extend farther into said paperboard layer than said flat cut surface.

8. The method of claim 6, wherein said cutting step is performed in such a manner as to make all portions of said flat cut surface extend farther into said paperboard layer than any portion of said oblique cut surface.

9. The method of claim 3, wherein said angle is less than approximately 30°.

10. The method of claim 3, further comprising the step of bending said wedge-shaped edge portion of said piece of material to cause the entire folded-over portion thereof to become substantially flush with said layer of heat sealable material.

11. The method of claim 3, wherein said piece of material is one that has printing on said layer of heat sealable material.

12. The method of claim 3, wherein said flat cut surface is formed by means of opposing milling.

13. The method of claim 3, wherein said oblique cut plane is defined before said flat cut surface is made.

14. The method of claim 3, wherein said oblique cut plane is defined after said flat cut surface.

15. The method of claim 3, wherein said oblique cut plane is defined by a set of generally parallel ridges.

16. The method of claim 15, wherein said ridges are produced by means of performing said cutting step to produce a step-like formation comprising a series of flat surfaces cut in said paperboard, each approximately parallel to the plane of said layer of heat sealable material, and each said flat surface being substantially narrower than said flat cut surface.

17. The method of claim 3, wherein said piece of material is a continuous web.

18. The method of claim 3, wherein said piece of material is a blank to be made into a single container.

19. The method of claim 6, wherein said cut surfaces intersect at said line.

20. The method of claim 1, further comprising the step of ironing the folded-over, sealed portion of said piece of material to make it substantially flush with said first surface.

21. The method of claim 3, further comprising also performing all of said steps on at least a second edge of said piece of sheet material.

22. The method of claim 10, further comprising also performing all of said steps on at least a second edge of said piece of sheet material.

23. The method of claim 18, wherein said steps are performed on each of at least two edges of said blank.

24. The method of claim 23, wherein said steps are performed on each of at least four edges of said blank.

* * * * *